A. HERDER.
WINDOW BLIND AND INSECT NET.
No. 21,417. Patented Sept. 7, 1858.
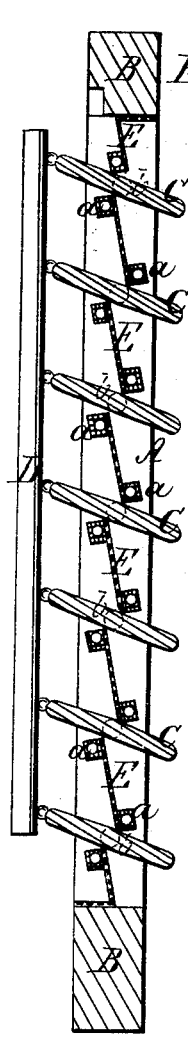
Fig. 1
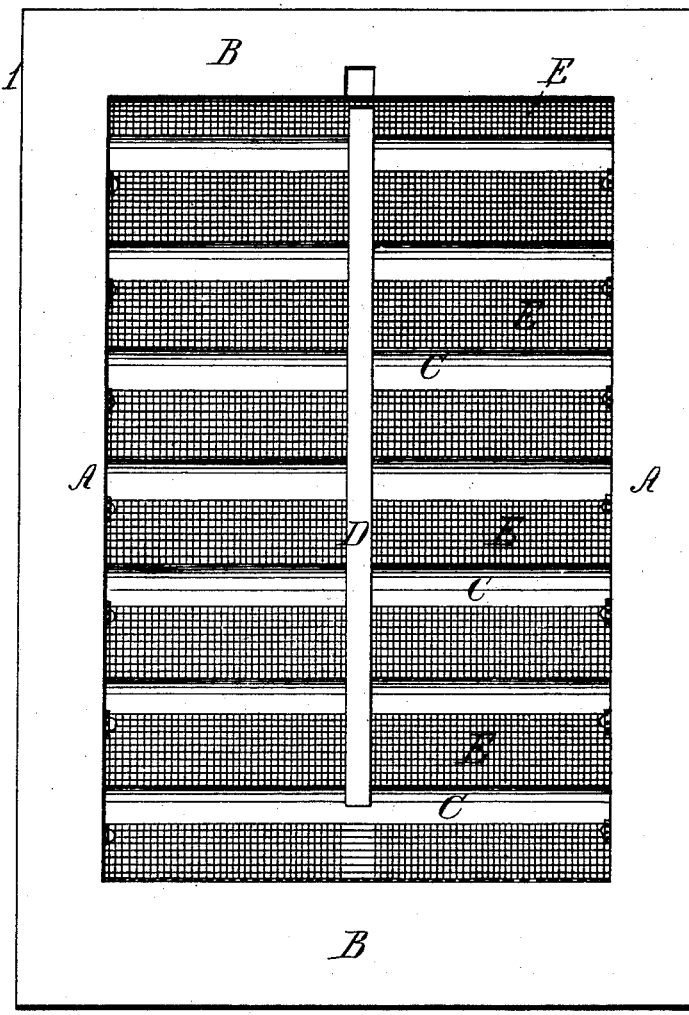
Fig. 2
Fig. 3
Fig. 4
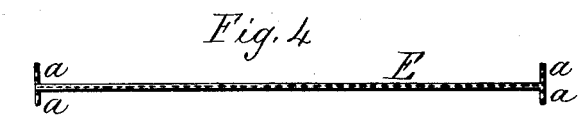

UNITED STATES PATENT OFFICE.

A. HERDER, OF NEW YORK, N. Y.

WINDOW-BLIND.

Specification of Letters Patent No. 21,417, dated September 7, 1858.

*To all whom it may concern:*

Be it known that I, A. HERDER, of the city, county, and State of New York, have invented a new and useful Insect-Net Attachment for Window-Blinds; and I do hereby declare that the following is a full, clear, and exact description of the same, reference being had to the annexed drawings, making a part of this specification, in which—

Figure 1, is a vertical transverse central section of my invention. Fig. 2, is a face or side view of ditto. Fig. 3, is a detached view of one of the wire nets. Fig. 4, is an edge view of ditto.

Similar letters of reference indicate corresponding parts in the several figures.

This invention consists in attaching a series of wire cloth strips to the blind in such a manner as not to interfere in the least with the opening and closing of the slats and at the same time effectually close the spaces between them, so as to prevent insects from passing between them.

To enable those skilled in the art to fully understand and construct my invention I will proceed to describe it.

A, A, represent the stiles and B, B, the end pieces of a window blind.

C, are the slats and D, the slat rods.

The window blind is constructed in the usual way and therefore does not require a minute description.

E, represents wire cloth strips the mesh of which are of a suitable size. These strips are cut from the wire cloth a trifle longer than the width of the space between the stiles A, A, of the blind so that two projecting ears *a*, *a*, may be formed at each end by cutting out a central portion at each end, see Fig. 3. The projecting portions or ears *a*, at each end of the strips are then bent in reverse direction at right angles with the main portions of the strips, see Figs. 1 and 4, and tacks are driven through the ears into the stiles of the blind, the ears serving as a means for attaching the strips to the blind. The strips E, are slightly inclined between the stiles as shown clearly in Fig. 1, and they entirely cover or fill up the spaces between the tenons of the slats C.

The strips E, are so inclined that their upper ends are in line with the inner edges of the tenons of the slats and their lower edges in line with their outer edges, see Fig. 1, in which the tenons *b*, are shown by dotted lines. By thus inclining the wire cloth strips E, the slats C, are allowed to open and close as usual and the space between the slats will be closed by the strips and effectually prevent insects from passing between the slats. Thus it will be seen that a combined blind and insect bar or net is obtained.

The wire cloth strips E, may be readily applied to an ordinary window blind at a trifling expense and will prove equally as effective in keeping insects out from apartments as the usual insect frames that are inserted in windows.

Having thus described my invention what I claim as new and desire to secure by Letters Patent, is,

The wire cloth strips E, attached to the window blind to form a combined blind and insect bar or net substantially as herein set forth.

A. HERDER.

Witnesses:
WM. TUSCH,
W. HAUFF.